(12) United States Patent
Stewart

(10) Patent No.: US 6,260,931 B1
(45) Date of Patent: Jul. 17, 2001

(54) SAFE QUICK-RELEASE BICYCLE AXLE FASTENER

(76) Inventor: John V. Stewart, 1308 Henry Balch Dr., Orlando, FL (US) 32810

(*) Notice: Subject to any disclaimer, the term of this patent is extended or adjusted under 35 U.S.C. 154(b) by 137 days.

(21) Appl. No.: 08/935,655

(22) Filed: Sep. 23, 1997

(51) Int. Cl.$^7$ .............................. B60B 35/00; B60B 27/00
(52) U.S. Cl. .................................. 301/124.2; 301/110.5
(58) Field of Search ............................... 301/124.2, 110.5, 301/110.6, 124.1, 105.1

(56) References Cited

U.S. PATENT DOCUMENTS

| | | | |
|---|---|---|---|
| 2,630,020 | 3/1953 | Juy | 74/242.14 |
| 3,922,018 | 11/1975 | Shook | 301/105 B |
| 4,033,627 | 7/1977 | Morroui | 301/111 |
| 4,079,958 | 3/1978 | Segawa | 280/279 |
| 4,392,690 * | 7/1983 | Anderson | 301/124.2 |
| 4,400,038 | 8/1983 | Hosokawa | 301/111 |
| 4,679,862 | 7/1987 | Luo | 301/112 |
| 4,724,692 | 2/1988 | Turin et al. | 70/225 |
| 4,763,957 | 8/1988 | Poehlmann et al. | 301/105 B |
| 4,770,011 | 9/1988 | Constant | 70/225 |
| 4,789,206 | 12/1988 | Ozaki | 301/111 |
| 4,906,053 | 3/1990 | Kawai | 301/105 |
| 4,964,287 | 10/1990 | Gaul | 70/233 |
| 5,121,973 | 6/1992 | Phillips | 301/105 B |
| 5,215,324 * | 6/1993 | Kawai | 301/124.2 |
| 5,494,390 * | 2/1996 | Gonzales | 301/124.2 |
| 5,526,661 * | 6/1996 | Lin | 301/110.5 |
| 5,567,020 * | 10/1996 | Phillips et al. | 301/110.5 |
| 5,653,512 * | 8/1997 | Phillips | 301/124.2 |
| 5,673,925 * | 10/1997 | Stewart | 301/124.2 |
| 5,676,227 * | 10/1997 | Hugi | 301/124.2 |
| 5,813,258 * | 9/1998 | Cova et al. | 301/124.2 |

FOREIGN PATENT DOCUMENTS

| | | |
|---|---|---|
| 463954 | 2/1952 | (FR) . |
| 341220 | 1/1931 | (GB) . |
| 441058 | 10/1948 | (IT) . |
| 460058 | 10/1950 | (IT) . |

* cited by examiner

Primary Examiner—S. Joseph Morano
Assistant Examiner—Long Bao Nguyen
(74) Attorney, Agent, or Firm—John V. Stewart

(57) ABSTRACT

A quick-release bicycle axle fastener comprising a lever-operated cam which presses a follower disc inward against the outer surface of a conventional safety dropout. The dropout has an outer surface with retention means for the disc, such as a concavity, tab, or ridge. A spring urges the cam lever toward its closed position. If the cam is left open by the user, the spring causes it to hold the follower against the retaining surface of the dropout, preventing accidental release of the axle. This safety feature is constant, automatic, and convenient. No action is needed beyond normal operation of the lever. The cam provides full clearance for releasing the axle, so the adjustment nut is only needed for initial installation, not for operation.

2 Claims, 5 Drawing Sheets

Figure 1:
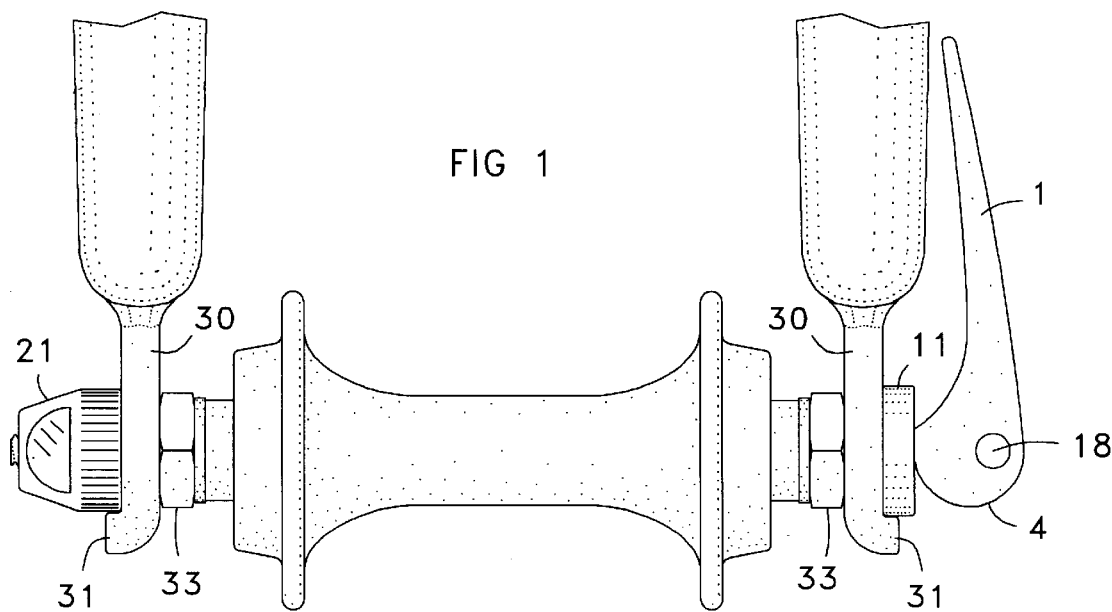

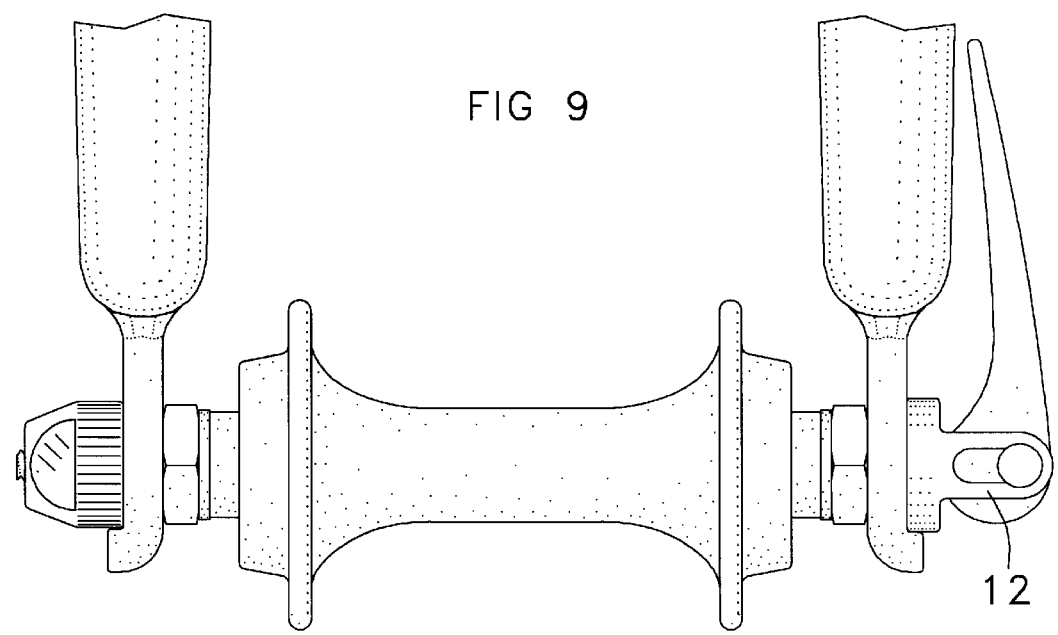
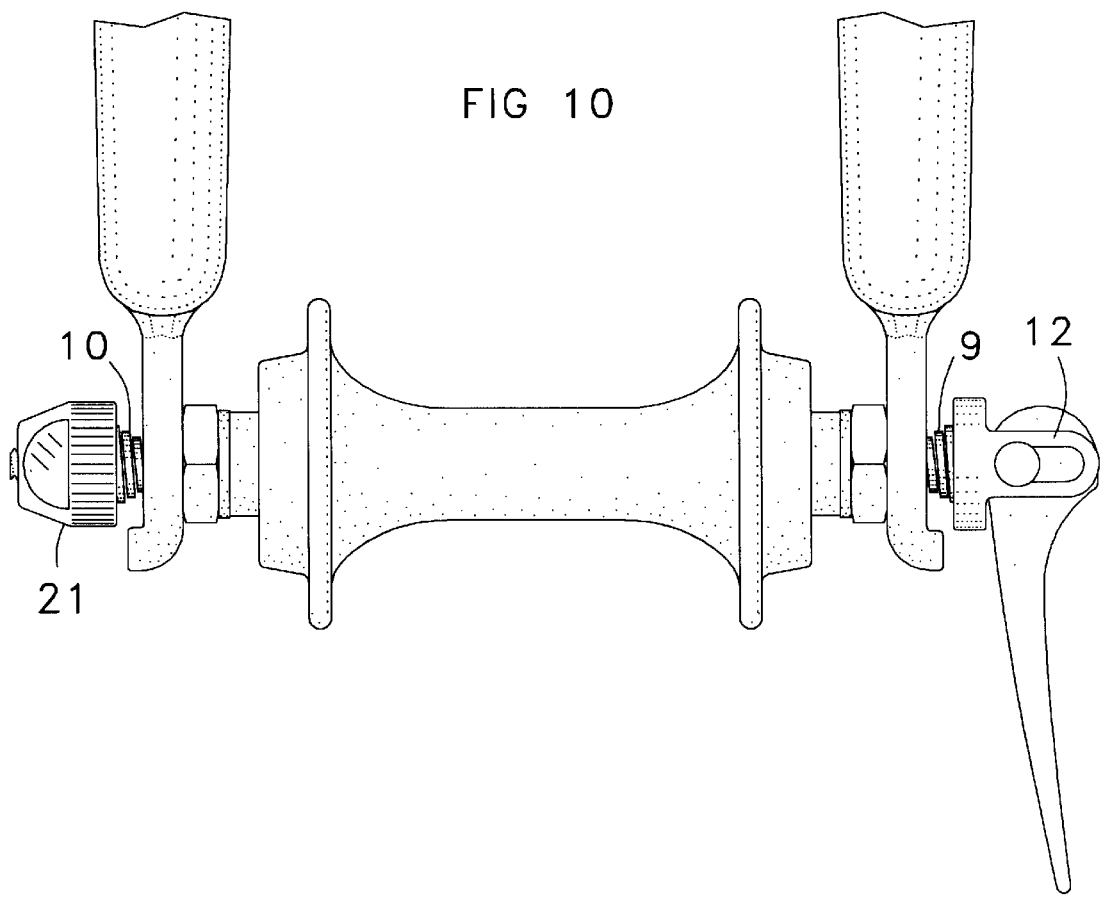

ized laterally with respect to the bicycle.

SAFE QUICK-RELEASE BICYCLE AXLE FASTENER

BACKGROUND

1. Field

This invention is in the field of quick-release bicycle axle fasteners.

2. Prior Art

Bicycle wheels are often attached to bicycles by a type of fastener which is quickly releasable without tools, to allow convenient removal of the wheel. This allows bicycle racers to quickly replace a wheel when a flat tire occurs. It also allows convenient wheel removal for attachment of bicycles to some types of bike racks, and for compact storage.

Conventional quick-release bicycle axle fasteners (QRs) trade convenience for safety. The release mechanism is usually a lever-operated cam, which can be inadvertently left open, causing the wheel to disengage from the bicycle unexpectedly. To solve this problem the axle mounting plates, or drop-outs, on bicycles now have a safety retention surface which retains the fastener even when the cam is loose. This is a depression or safety tab on the outer surface of each dropout, which retains the cam tension adjustment nut and cam follower of the fastener. To disengage the fastener from the retention surface, the adjustment nut must be loosened. This means the conventional QR must be readjusted each time the axle is reinstalled. This adjustment is often done incorrectly by the average user, resulting in riding accidents due to wheel disengagement.

Earlier attempts to solve this problem have not been successful, either because they were an incomplete solution, were inconvenient, expensive, or had other disadvantages, such as alternate safety problems.

The best solution to date has come from inventor Cal M. Phillips, who added a safety-interlock slide inboard and around the cam adjustment nut. When the cam is open, the slide is urged inward against the safety drop-out by a spring. When the cam is dosed, the slide stops outward against the adjustment nut, providing full clamping force. Cam adjustment is made with a wrench on the adjustment nut when the axle is first installed in the drop-outs. The nut is not subsequently loosened for each operation of the fastener. The cam has a large enough throw to clear both safety retention tabs without assistance of the adjustment nut. To release the fastener, the user opens the cam, then pulls the slide outward with the fingers while pressing the adjustment nut with the thumb, as with a hypodermic needle. This releases both ends of the fastener from the safety tabs on the dropouts, providing a quick, convenient, safe QR. The only additional action required for operation is simultaneously pressing the adjustment nut and pulling the slide outward with the fingers. This additional action is eliminated by the present invention.

SUMMARY

The object of this invention is a quick-release axle fastener (QR) which is retained by standard safety dropouts when the cam is left open by the user, is fully quick and convenient to operate, and does not require any action by the user beyond opening and closing the cam lever. In order to achieve these objectives, the QR must not require readjustment for each operation, as do conventional QRs.

The invention is a quick-release bicycle axle fastener comprising a lever-operated cam which presses a follower disc inward against the outer surface of a conventional safety dropout The drop-out has an outer surface with retention means for the disc, such as a concavity, tab, or ridge 31. A spring urges the cam lever toward its dosed position. If the cam is left open by the user, the spring urges the cam to hold the follower against the retaining surface of the dropout, preventing accidental release of the axle This safety feature is constant, automatic, and convenient. No action is needed beyond normal operation of the lever. The cam provides full clearance for releasing the axle, so the adjustment nut is only needed for initial installation, not for operation.

DRAWINGS

FIG. 1 Front view of bicycle hub with axle fastener dosed.

Figure 2:
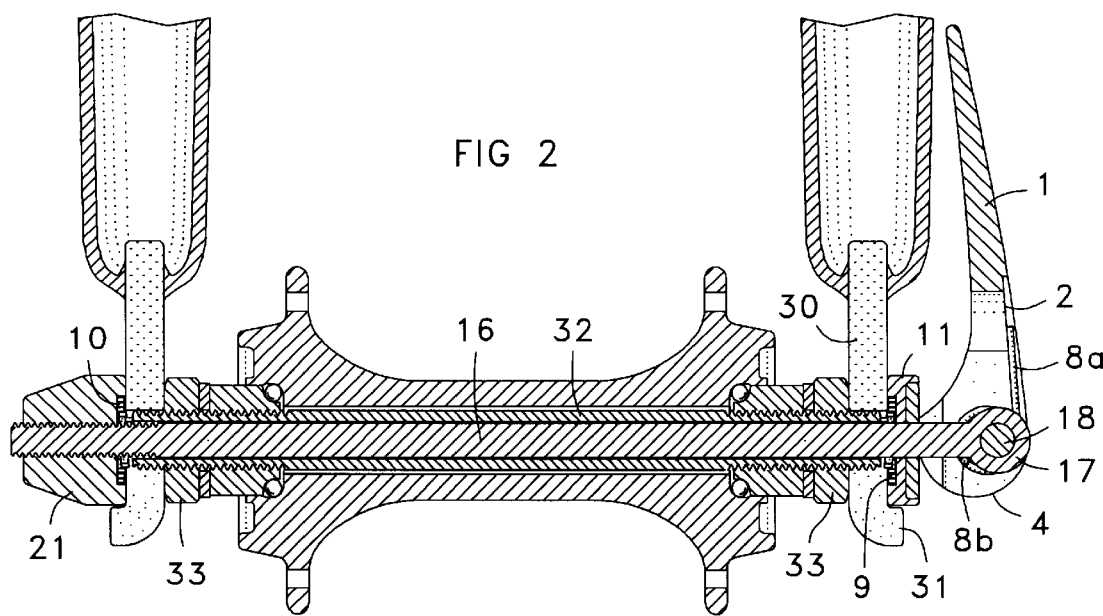

FIG. 2 Front sectional view of FIG. 1.

Figure 3:
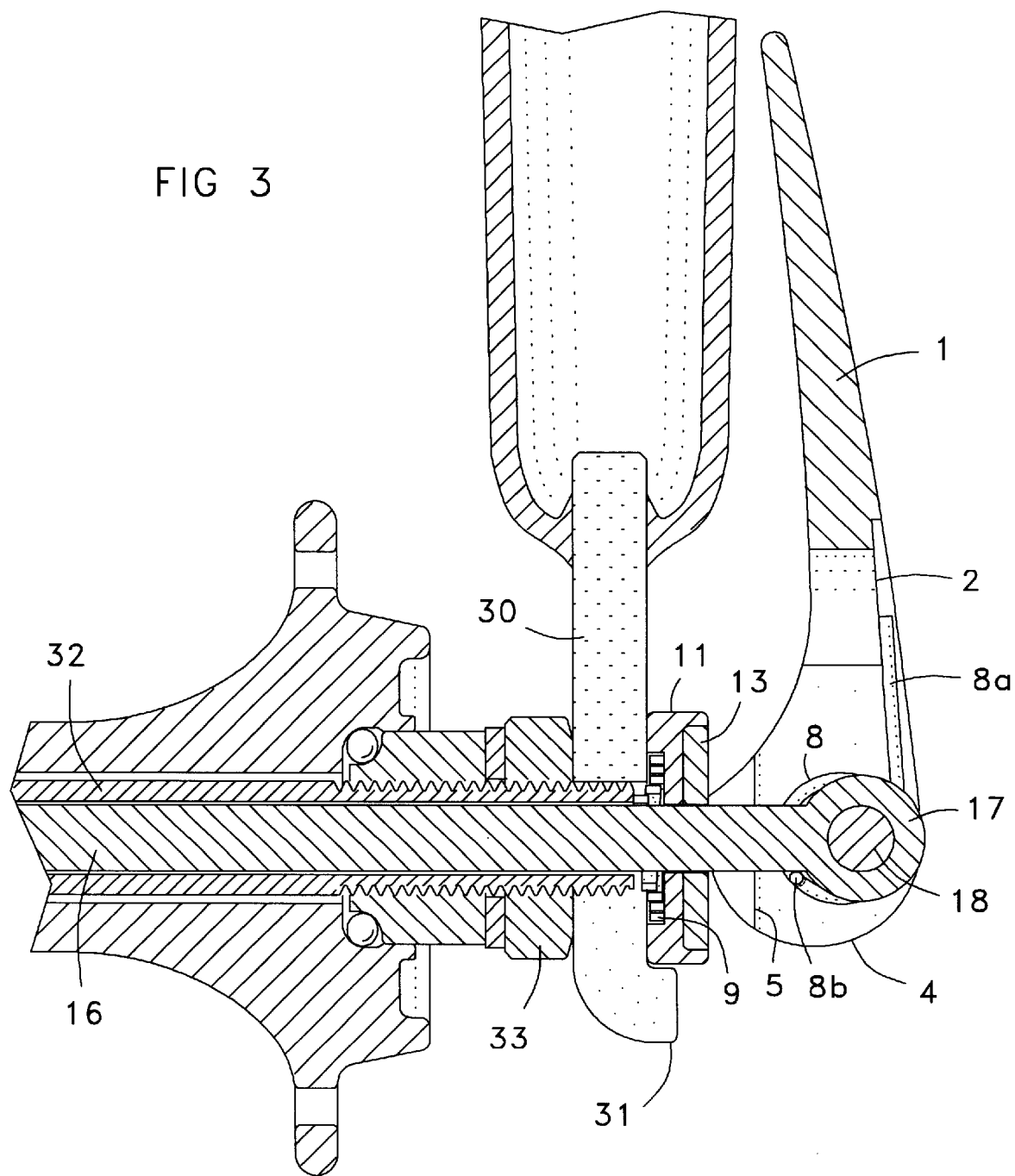

FIG. 3 Enlarged front sectional view of the cam mechanism in its dosed position.

Figure 4:
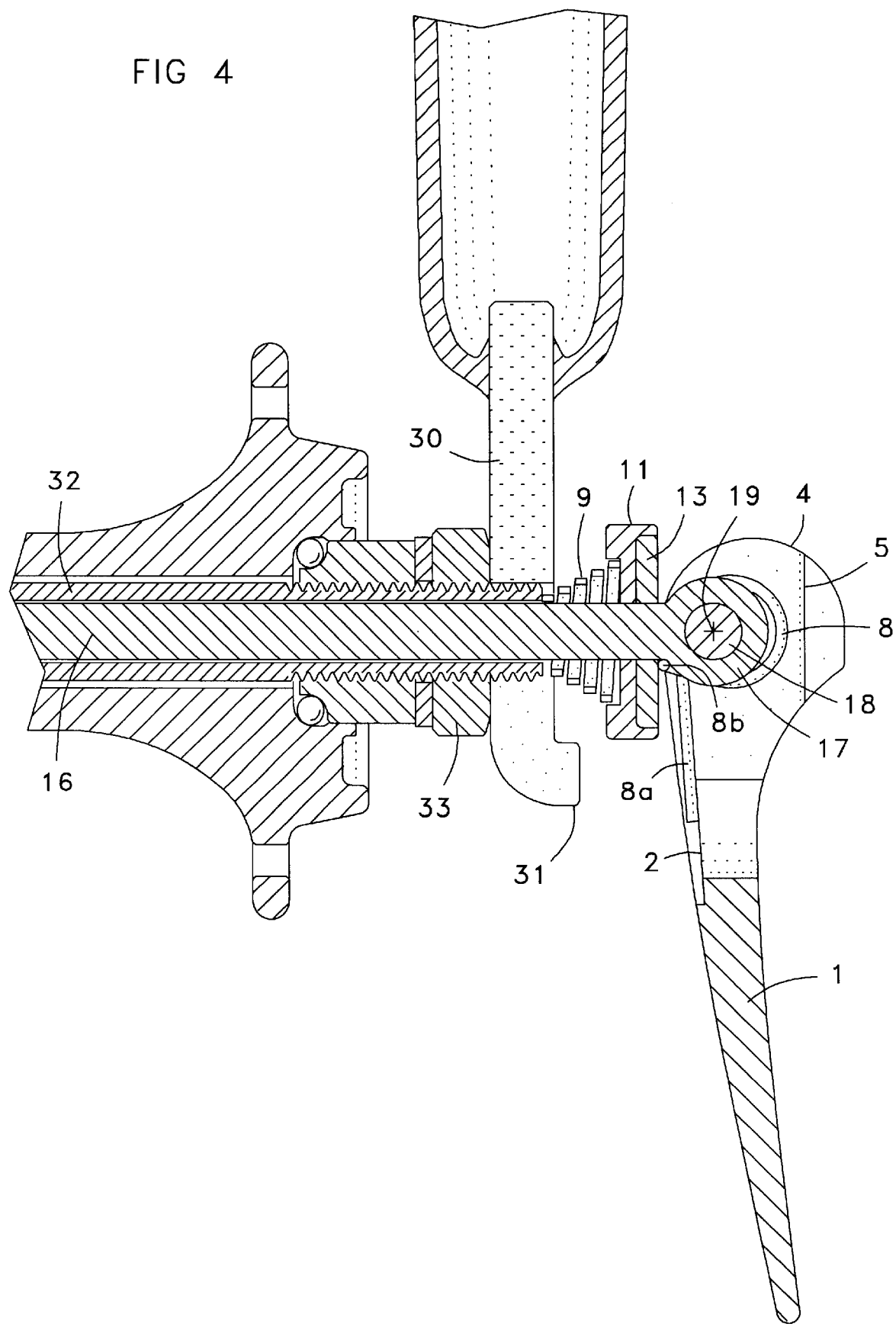

FIG. 4 Enlarged front sectional view of the cam mechanism in its open position.

Figure 5:
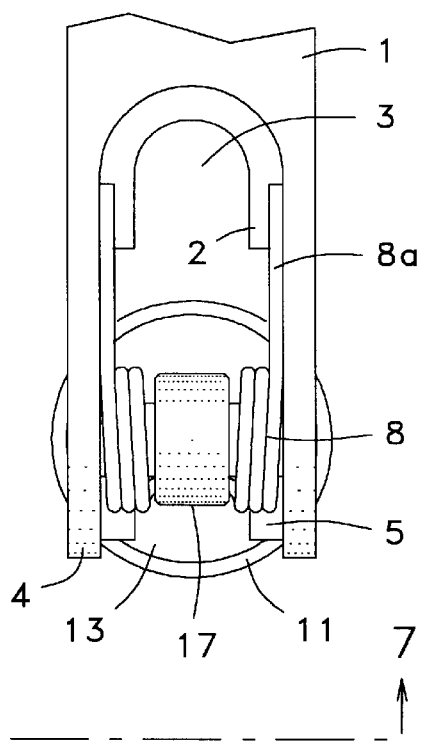

FIG. 5 Partial outer end view of the cam mechanism in its dosed position.

Figure 6:
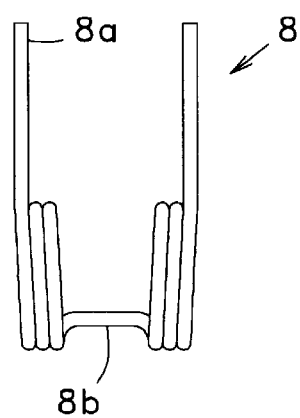

FIG. 6 Outer end view of double helical torsion spring for automatic lever closure.

Figure 7:
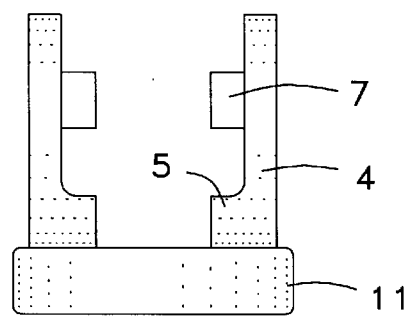

FIG. 7 Bottom view along line 7 of FIG. 5.

Figure 8:
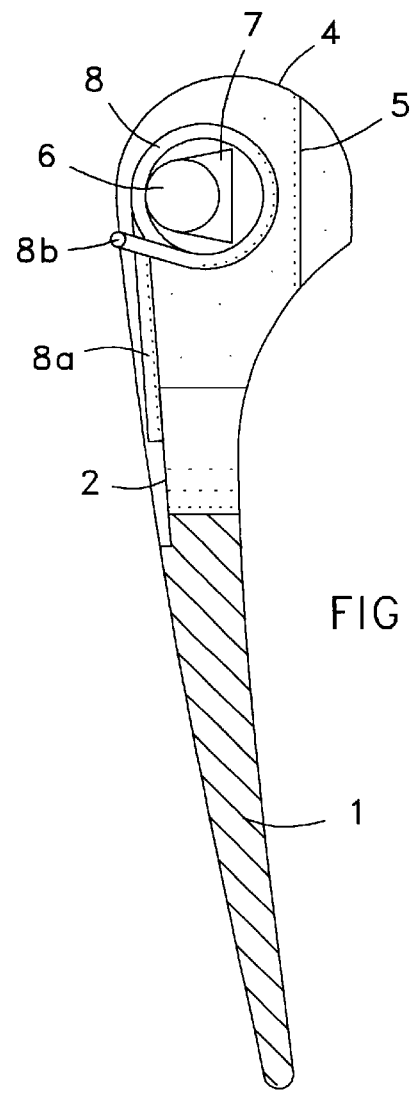

FIG. 8 Front sectional view of the cam lever and lever spring, with the cam in open position.

FIG. 9 Front view of optional linear guide (12) on follower, with cam in dosed position.

FIG. 10 Front view of optional linear guide (12) on follower, with cam in open position.

REFERENCE NUMERALS

1. Cam lever
2. Spring retaining shelf on cam lever
3. Access slot in cam lever
4. Cam lobe
5. Optional cam surface enlargement for force distribution
6. Hole in cam for pivot pin
7. Mandrel on cam for spring
8. Lever spring
8a. Free end of lever spring
8b. Center arm of lever spring
9. First centering spring
10. Second centering spring
11. Follower disc
12. Optional linear guide on follower
13. Low friction insert in follower
16. Spindle
17. Spindle head
18. Cam pivot pin
19. Campivotazas
21. Adjustment nut
30. Safety dropout
31. Safety tab or ridge on drop-out
32. Hollow axle
33. Axde bearing lock nut

TERMINOLOGY axial—parallel to the axle. An axial movement is also a lateral movement, since the axle is oriented laterally with respect to the bicycle.

Inboard—laterally closer to the center of the axle. Proximal.
Inward—laterally toward the center of the axle.
Lateral—in relation to the bicycle. For example, the wheel axle is oriented laterally.
Outboard—laterally farther from the center of the axle. Distal.
Safety drop-out—a mounting plate with an open-ended slot for receiving a wheel axle, the plate having an outer surface with fastener retention means such as a concavity, tab, or ridge 31.

DESCRIPTION

FIG. 1 is a front external view of the invention, with the cam lever (1) in its closed position (upward). FIG. 2 is a front sectional view of FIG. 1. The cam (4) presses the follower disc (11) inward against a safety dropout (30). A spindle (16) passes through the hollow axle (32). The pivot pin (18) of the cam is journalled through the head (17) of the spindle. An adjustment nut (21) is threaded on the opposite end of the spindle. It is pulled inward against the dropout by the spindle when the cam is closed. This clamps the two dropouts (30) against the axle bearing lock nuts (33), between the follower disc (11) on one end and the adjustment nut (21) on the other end.

FIG. 3 is an enlarged sectional view of the cam mechanism. A spring (8) is configured to rotate the cam toward its closed position. This spring is preferably a dual helical torsion spring as shown in FIG. 6. The free ends (8a) of the spring are retained by shelves (2) on the lever. The central arm (8b) of the spring is retained against the spindle (16).

FIG. 4 shows the cam open, with the lever downward. The follower disc (11) is held outward against the cam by a centering spring (9), which can be a conventional conical spring acting between the end of the hollow axle (32) and the follower disc. Optionally, a second conical spring (10) acts between the other end of the hollow axle and the adjustment nut (21). With two opposed conical springs the spindle is centered in the axle when the cam is open. This holds the disc (11) and adjustment nut (21) equally outward, clearing both retention surfaces (31) for axle removal without manual centering of the spindle. The conical spring (9) should have closed ends to avoid tilting the follower (11). The cam should be large enough to provide clearance for both the adjustment nut (21) and cam follower (11) from the retention surfaces (31) on both dropouts. This allows the axle to be removed without loosening the adjustment nut.

If the user fails to fully close the lever, or it is knocked open, the axle will remain engaged in the drop-outs, since the cam lever constantly attempts to close. This holds the follower disc and adjustment nut within the retention surfaces of the respective safety drop-outs. The closing force of the lever spring (8) is opposed by the opening effect from the centering spring (9). The lever spring must be strong enough to prevail over the centering spring. It has an advantage in this contest due to the mechanical advantage of the cam.

FIGS. 7 and 8 show details of the cam and lever design. An optional mandrel (7) on the cam holds the coils of the torsion spring at a desirable position within the cam lobes. The mandrel is preferably cylindrical if the manufacturing method permits it. The angular shape shown in the drawings is machinable. The pivot pin can serve as mandrel, but a larger mandrel which is offset from the pivot pin, as shown in FIG. 8, allows larger spring coils to be used without extending beyond the perimeter of the cam lobes.

Other spring arrangements are possible. For example, the second centering spring (10) can be eliminated. In this case, the first centering spring (9) is opposed by the manual inward force on the lever when it is held open. If the lever spring (8) and centering spring (9) are balanced as to the manual force on the lever, the spindle will be is centered in the axle when the user holds the lever open.

Conventional cam designs can be used. An insert (13) in the follower disc (11), made of a low-friction material such as plastic, is recommended. The cam should be made stable in the closed position, via a flat terminating portion on the cam surface and/or a stable offset between the cam pivot axis (19) and the main lobe geometric center. The insert (13) can have a concave surface that conforms to the cam main lobe surface if desired. This provides a larger contact surface area to reduce stress concentration on the insert. The cam can operate over 180 degrees as shown, or can be designed to operate over 90 degrees. A 90-degree cam reduces the range required in the lever spring, and eliminates the axial decentering force on the spindle from the user's hand holding the lever open. However, it increases the rate of the cam, thus decreases its mechanical advantage.

The lever spring or springs can take other forms. For example, rather than being placed between the cam lobes, the spring(s) can be external to the cam, with torsion coil(s) beside each lobe. Any practical spring design that urges the cam to close can be used.

FIGS. 9 and 10 show optional slotted guide arms (12) on the follower which slide along an extension of the cam pivot pin (18). This prevents the follower from tilting when the cam is open.

Although the present invention has been described herein with respect to preferred embodiments, it will be understood that the foregoing description is intended to be illustrative, not restrictive. Many modifications of the present invention will occur to those skilled in the art. All such modifications which fall within the scope of the appended claims are intended to be within the scope and spirit of the present invention.

I claim:

1. An improved bicycle wheel axle assembly for bicycles of a type having two opposed axle mounting plates with open-ended slots and safety retention surfaces, a hollow wheel axle, a spindle passing through the hollow axle, an adjustment nut on one end of the spindle, a cam on the other end of the spindle, the cam having a closed position that clamps the axle between the mounting plates, the improvement comprising a spring attached to the cam that urges the cam to rotate to its closed position.

2. A quick-release bicycle axle fastener for attaching a hollow axle between two safety dropouts on a bicycle, comprising:

a spindle having a first end and a second end, the spindle extending through the hollow axle;

a cam pivotally mounted on the first end of the spindle;

a lever attached to the cam;

a cam follower slidably mounted on the spindle adjacent to, and inboard of, the cam, the cam operating against the follower to move the follower axially along the spindle during pivoting of the cam; and a spring acting between the spindle and the cam, urging the cam to pivot in a direction that moves the follower inward toward the second end of the spindle.

* * * * *